United States Patent
Jakubowski, Jr.

(10) Patent No.: US 6,892,985 B2
(45) Date of Patent: *May 17, 2005

(54) STORE EJECTION SYSTEM WITH DISPOSABLE PRESSURE VESSEL AND ASSOCIATED METHOD OF OPERATION

(75) Inventor: Thaddeus M. Jakubowski, Jr., St. Charles, MO (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/780,521

(22) Filed: Feb. 16, 2004

(65) Prior Publication Data

US 2004/0159739 A1 Aug. 19, 2004

Related U.S. Application Data

(63) Continuation-in-part of application No. 10/205,570, filed on Jul. 25, 2002, now Pat. No. 6,758,441, and a continuation-in-part of application No. 10/461,230, filed on Jun. 13, 2003, now Pat. No. 6,764,048.

(51) Int. Cl.[7] .................................................. B64D 1/12
(52) U.S. Cl. ..................................... 244/137.4; 60/1.54
(58) Field of Search ........................ 244/137.4; 89/1.54, 89/1.51, 1.59; 294/82.26, 82.31

(56) References Cited

U.S. PATENT DOCUMENTS

| | | | |
|---|---|---|---|
| 3,787,012 A | 1/1974 | Jakubowski, Jr. | |
| 3,887,150 A | 6/1975 | Jakubowski, Jr. | |
| 4,043,525 A | 8/1977 | Jakubowski, Jr. | |
| 4,095,762 A | 6/1978 | Holt | |
| 4,204,456 A | 5/1980 | Ward | |
| 4,343,447 A | * 8/1982 | Reed, III | 244/137.4 |
| 4,347,777 A | 9/1982 | Jakubowski, Jr. et al. | |
| 4,552,327 A | 11/1985 | Carter | |
| 4,746,083 A | 5/1988 | Dupin et al. | |
| 4,905,568 A | 3/1990 | Hetzer et al. | |
| 5,029,776 A | * 7/1991 | Jakubowski et al. | 244/137.4 |
| 5,238,209 A | 8/1993 | Hornyak | |
| 5,409,187 A | 4/1995 | Dunham | |
| 5,411,225 A | 5/1995 | Lannon et al. | |
| 5,583,312 A | 12/1996 | Jakubowski, Jr. | |
| 5,857,647 A | 1/1999 | Jakubowski, Jr. | |
| 5,907,118 A | 5/1999 | Jakubowski, Jr. et al. | |
| 6,035,759 A | 3/2000 | Jakubowski, Jr. et al. | |
| 6,119,982 A | * 9/2000 | Jakubowski et al. | 244/137.4 |
| 6,347,768 B1 | 2/2002 | Jakubowski, Jr. et al. | |

OTHER PUBLICATIONS

Ed Mygland; Pneumatic Ejector Release Unit; Proceedings 8th JOCG Aircraft/Stores Compatibility Symposium, Oct. 23–25, 1990; pp. 32–14, 32–15 and 32–16; Fort Walton Beach, Florida.

* cited by examiner

*Primary Examiner*—Tien Dinh
(74) *Attorney, Agent, or Firm*—Alston & Bird LLP

(57) ABSTRACT

There is provided a store ejection system and method that use a pressurized non-pyrotechnic gas as the source of energy and transfer mechanism for jettisoning a store, such as from an aircraft. The ejection system includes an on-board pressure vessel for holding the pressurized gas with a releasable valve configured to hermetically seal the pressure vessel. The pressure vessel is releasably connected to system and the releasable valve is configured to be released after the pressure vessel is connected thereto so that the releasable seal hermetically seals the pressure vessel before the pressure vessel is connected to the pressure regulator. The ejection system also includes at least one actuation system and at least one pneumatically-driven jettison mechanism for releasably retaining the store.

15 Claims, 6 Drawing Sheets

STORE EJECTION SYSTEM WITH DISPOSABLE PRESSURE VESSEL AND ASSOCIATED METHOD OF OPERATION

CROSS-REFERENCES TO RELATED APPLICATIONS

This application is a continuation-in-part of both U.S. patent application Ser. No. 10/205,570, filed on Jul. 25, 2002 now U.S. Pat. No. 6,758,441, and U.S. patent application Ser. No. 10/461,230, filed on Jun. 13, 2003 now U.S. Pat. No. 6,764,048, which is a divisional thereof, both of which are hereby incorporated herein in their entirety by reference.

BACKGROUND OF THE INVENTION

1) Field of the Invention

The present invention relates to a system and method for ejecting stores and, more particularly, to a store ejection system and method that use a pressure vessel of pressurized non-pyrotechnic gas for providing the source of energy and the transfer mechanism to eject the stores.

2) Description of Related Art

The term "store" is used herein to refer generally to any of a number of munitions or other materials that can be dispensed from an aircraft, submarine, or other vehicle. For example, military aircraft can include a store ejection system to dispense bombs, missiles, rockets, and other types of munitions. Non-munitions stores can include electronic equipment and other materials. Typically, the store ejection system includes one or more racks beneath the wings or fuselage of the aircraft for holding the stores and releasing the stores upon a command. For example, store racks are described in U.S. Pat. Nos. 5,907,118 and 6,035,759, both by the same inventor and assignee as the present invention.

In one conventional store ejection system, the stores are connected to the racks by one or more mechanical hooks. The store ejection system includes a release mechanism for actuating the hooks to release the stores and a jettison mechanism for forcibly ejecting the stores away from the aircraft. The jettison mechanism can include a pressure-actuator, such as a ram that is actuated by a pressure increase in a cylinder. In the conventional system, the pressure is generated by a pyrotechnic cartridge, i.e., an explosive. Ignition of the pyrotechnic cartridge initiates a chemical reaction that generates a high pressure, which can be used for actuating the release mechanism and the jettison mechanism.

Although such pyrotechnic cartridges provide a weight efficient unit for storing and releasing energy, the cartridges present a number of maintenance, reliability, and safety concerns. For example, the chemical reaction of the explosive charge in the cartridge generates a large amount of residue. Some of the residue is deposited in the ejection system where it can clog or otherwise interfere with the components of the ejection system. Moisture and corrosives in the residue can also damage the ejection system. Additionally, moisture deposited in the ejection system can freeze or gather additional debris. To avoid unreliability and possible failure, the ejection system must be disassembled and cleaned regularly, thus increasing the cost and downtime for maintaining the system. Such cleaning often requires the use of hazardous cleaning solvents that require care in storage, use, handling, and disposal. Further, due to the pyrotechnic nature of the cartridges, special storage and handling precautions for the cartridges are necessary. For example, ground crew personnel must use special equipment to conduct stray voltage checks before installing the cartridges to prevent inadvertent firing. Also, unspent cartridges must be removed before unloading unreleased stores from the aircraft.

Non-pyrotechnic ejection systems have been proposed, such as the pneumatically-driven store ejection system described in U.S. Pat. No. 5,583,312, which is also by the same inventor and assignee as the present invention. That device does not require pyrotechnic cartridges, but instead includes a compressor for compressing a non-pyrotechnic gas that is then used to actuate ejector pistons of one or more suspension and release equipment (S & RE) modules that releasably retain and jettison stores. The pressurized gas, which can comprise ambient air, does not deposit a significant amount of residue on the system components. Thus, the residue build-up and corrosion resulting from pyrotechnic chemicals are eliminated and the maintenance required on the system is minimized. However, the compressor adds to the initial cost of the system and the recurring costs for overhauling and maintaining the compressor. The compressor also adds to the overall weight of the system. Further, the compressor requires the availability of sufficient power from the aircraft's electrical or hydraulic systems to drive the compressor motor. In addition, the compressor must generate sufficient pressure to release the stores, so the compressor requires an interval of time for preparing the release of the store. The time required to achieve a sufficient pressure is dependent on the compressor, the number and size of ejector racks that are connected to the system, and the air density, which varies with altitude. Therefore, the release of the stores can be delayed while the compressor generates the required pressure.

There have also been proposed ejector devices that use a stored volume of compressed gas to provide the energy for ejection. For example, U.S. Pat. Nos. 4,095,762 and 4,905,568 to Holt and Hetzer et al., respectively, each describe an ejector mechanism that uses a pressurized gas as the energy source for ejection and a hydraulic fluid, which acts as the energy transfer mechanism for ejection. Both patents describe that the hydraulic fluid can be used to re-pressurize the gas after ejection. Holt specifies that the action of recocking a piston moves the hydraulic fluid and thereby re-pressurizes the gas. Hetzer recites that after ejection, a pump is used to pump the hydraulic fluid, and the hydraulic fluid thereby acts on the gas to re-pressurize it. Therefore, neither patent requires a compressor for re-pressurizing the gas. However, the hydraulic systems add weight and complexity to the ejector device. Further, the pump of Hetzer for pumping the hydraulic fluid adds weight, power, and timing concerns similar to those discussed above in connection with the compressor of U.S. Pat. No. 5,583,312. Similarly, in the case of Holt, some additional device would be required for recocking the system.

U.S. Pat. No. 4,204,456 to Ward discloses a pneumatic bomb ejector that uses a pressurized gas from a storage container for the energy required to eject the bomb. However, no specific storage container is described, and there is no description regarding how and when the storage container is pressurized. Pressurizing the container during flight would require a pressurization device, such as a compressor, again with the weight, power, and timing concerns noted above. Alternatively, if the storage container is pre-pressurized before the aircraft takes off so that no on-board compressor is needed, the pressure in the storage container will fluctuate as the temperature of the gas in the storage container changes with the ambient temperature. Further, the pressure in the storage container will not be affected by changes in the ambient pressure. Thus, the differential in pressure between the storage container and the ambient air will change as the aircraft changes altitude, thereby changing the operational characteristics of the ejector and possibly resulting in incorrect or failed ejections. Additionally, refilling the container before take-off would require that the container be connected to a refilling device, which could delay the flight. Additional maintenance of the container, such as inspection or repair, would also add to the cost of operation and could increase the time required for on-ground preparation before flight.

Thus, there is a need for a store ejection system and method that use a non-pyrotechnic gas as the source of energy and transfer mechanism for jettisoning a store from an aircraft, submarine, or other vehicle. The system should not require the use of pyrotechnic reactions or an on-board compressor system, and maintenance required for providing the non-pyrotechnic gas should be minimized. Preferably, the system should not require a long time delay to achieve pressurization. Additionally, the system should require little or no power from the vehicle's electrical or hydraulic systems for pressurizing the gas.

BRIEF SUMMARY OF THE INVENTION

The present invention provides a store ejection system, a pressure vessel, and a method for jettisoning a store using a non-pyrotechnic gas as the energy and transfer mechanisms. The gas is held pressurized in the on-board pressure vessel so that no pyrotechnic reaction or on-board compressor is required for pressurization, thereby simplifying system maintenance, complexity, weight, and ejection timing. The pressure vessel is releasably connected to the pressure regulator, and can therefore be removed after use for quick replacement. A releasable valve on the pressure vessel provides a hermetic seal until the pressure vessel is connected to the system and the valve is opened.

According to one embodiment of the present invention, the ejection system includes an on-board pressure vessel of pressurized non-pyrotechnic gas with a releasable valve that has an adjustable valve member adapted to be adjusted from a closed position to an open position to release the gas from the vessel. The ejection system also includes an actuation system having an accumulator that is configured to be fluidly connected to the pressure vessel to receive and store the gas from the pressure vessel. A dump valve controls a flow of gas from the accumulator, and a controller actuates the dump valve to an open position in response to a control signal to jettison the store. A pneumatically-driven jettison mechanism is fluidly connected to the dump valve so that actuating the dump valve to the open position releases the pressurized gas in the accumulator to flow to the jettison mechanism. A relief valve can also be provided for venting the gas from the accumulator.

A valve actuator is configured to receive a signal from the controller and adjust the valve member of the releasable valve from the closed position to the open position in response to the signal from the controller after the pressure vessel is installed in the system. Thus, the releasable valve hermetically seals the pressure vessel until the pressure vessel is installed in the system and the controller issues the signal to the valve actuator. According to one aspect of the present invention, the releasable valve has a valve body with an aperture that provides a passage for the gas to flow from the pressure vessel to the accumulator. The adjustable valve member is slidably adjustable in the aperture from the closed position to the open position, and is biased in the closed position against the valve body to seal the aperture. For example, the adjustable valve member can be configured to slide toward an internal space of the pressure vessel to open the valve so that the gas in the pressure vessel biases the adjustable valve member to the closed position. Additionally, or alternatively, a spring can bias the adjustable valve member to the closed position. Further, a lock spring member can be configured to open when the adjustable valve member is adjusted to the open position so that the lock spring member locks the adjustable valve member in the open position. The valve actuator can be configured to advance a plunger in response to the signal from the controller so that the plunger linearly slides the adjustable member to the open position.

In any case, the pressure vessel can be substantially directly fluidly connected to the accumulator so that the gas is delivered from the pressure vessel to the accumulator with a substantially uniform pressure therebetween. The jettison mechanism further can include one or more hooks for releasably retaining the store, the hooks being actuated to release the store by the pressurized gas exiting the accumulator through the dump valve. Further, the jettison mechanism can include one or more ejector piston for forcibly jettisoning the store when the hook has been actuated to a release position.

According to another embodiment, the present invention provides a method of ejecting stores using a gas as the source of energy and the transfer mechanism. The method includes releasably retaining a store with a pneumatically-driven jettison mechanism, releasably connecting an on-board pressure vessel of pressurized non-pyrotechnic gas to an accumulator, and actuating a valve actuator to adjust a valve member of a releasable valve of the pressure vessel so that the pressure vessel is fluidly connected to the accumulator. Thereafter, a dump valve is actuated to an open position to fluidly connect the accumulator to the jettison mechanism so that the gas flows from the accumulator to the jettison mechanism and actuates the jettison mechanism to jettison the store. The pressure vessel can be pressurized and hermetically sealed with the releasable valve before the vessel is connected to the system.

According to one aspect of the invention, the valve actuator is opened by sliding the valve member in an aperture of a valve body of the releasable valve toward an internal space of the pressure vessel. For example, a plunger of the actuator can be advanced to linearly slide the adjustable member to the open position. Before the valve actuator adjusts the valve member, the valve member can be biased to a closed position against the valve body by the pressure of the gas in the pressure vessel and/or by a spring. A lock spring member can be opened when the adjustable valve member is adjusted so that the lock spring member locks the adjustable valve member in the open position.

The store can be releasably retained with one or more hooks, and each hook can be actuated to an open position to release the store by actuating the dump valve. In addition, actuating the dump valve can fluidly connect the accumulator to one or more ejector pistons so that the gas flowing from the accumulator actuates each ejector piston to jettison the store.

BRIEF DESCRIPTION OF THE SEVERAL VIEWS OF THE DRAWINGS

Figure 1:
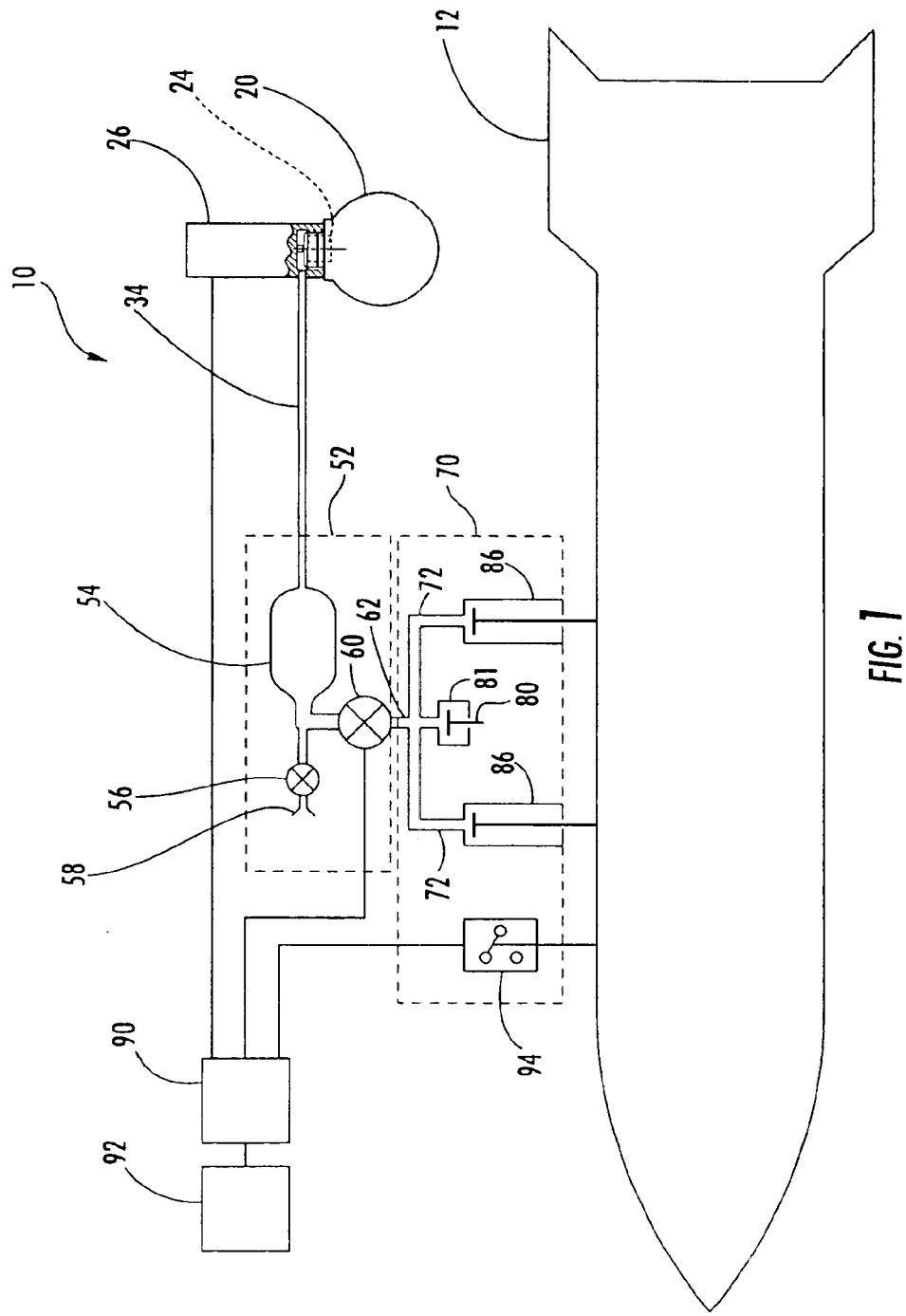
Figure 2:
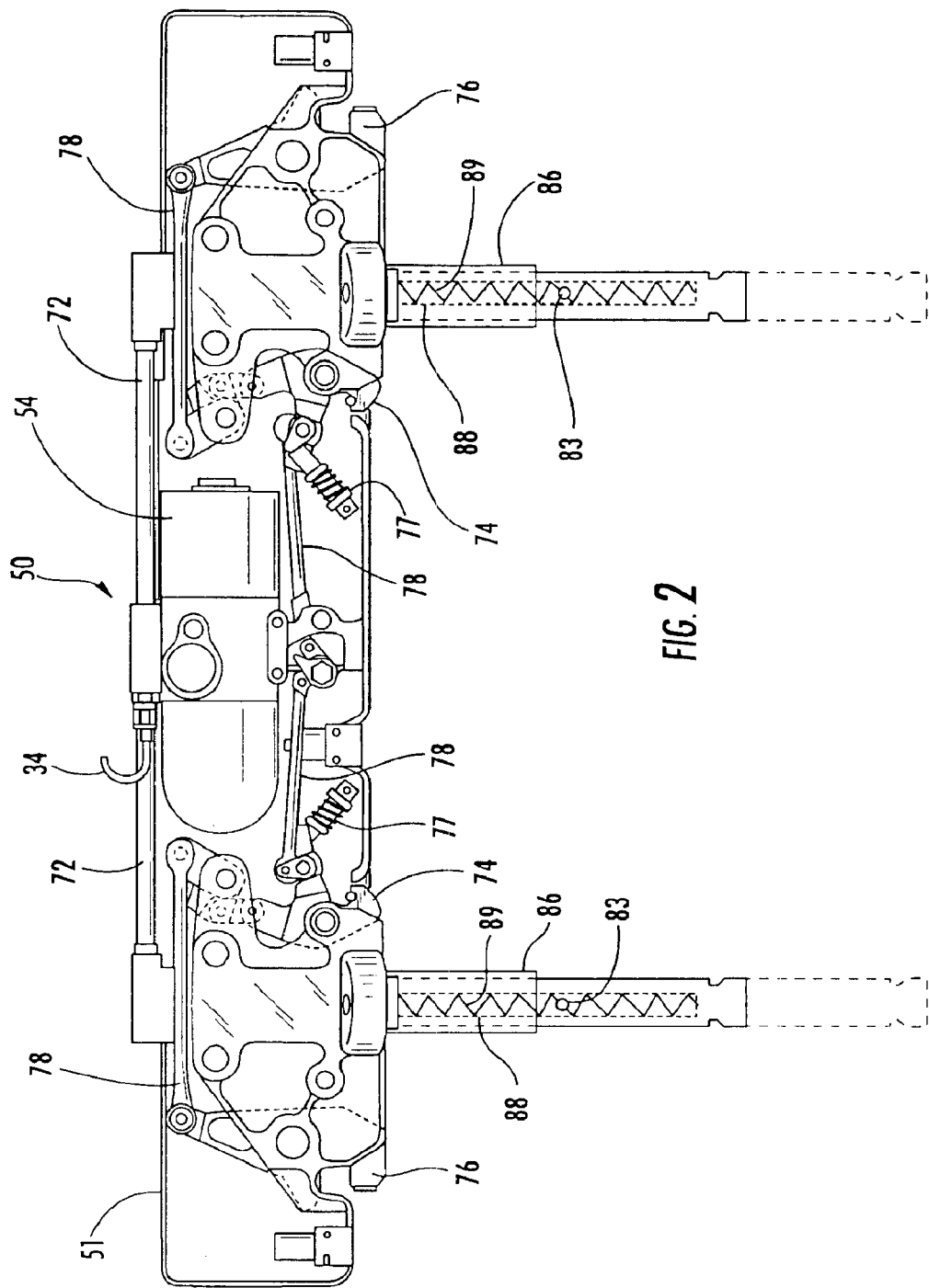
Figure 3:
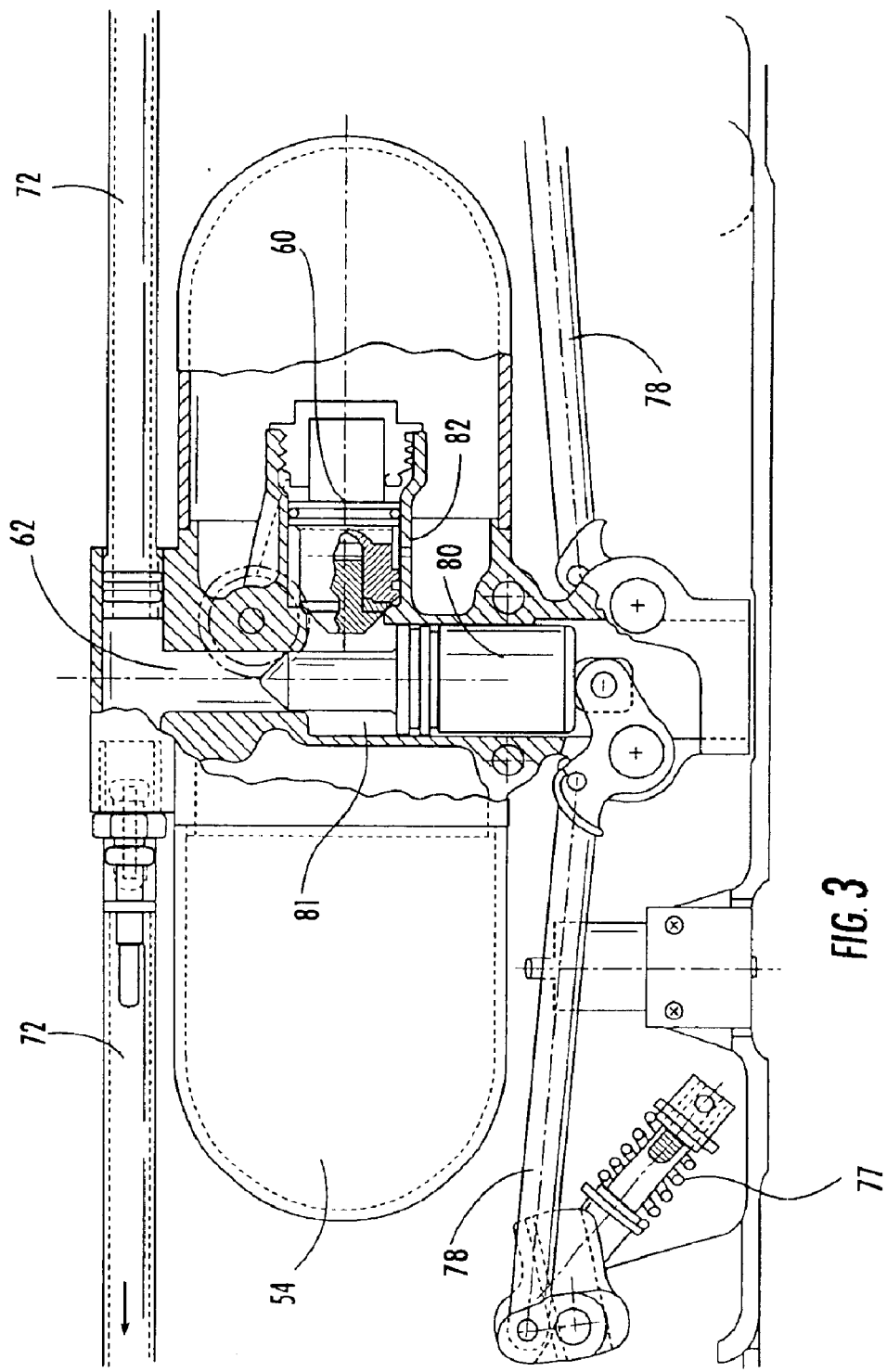
Figure 4:
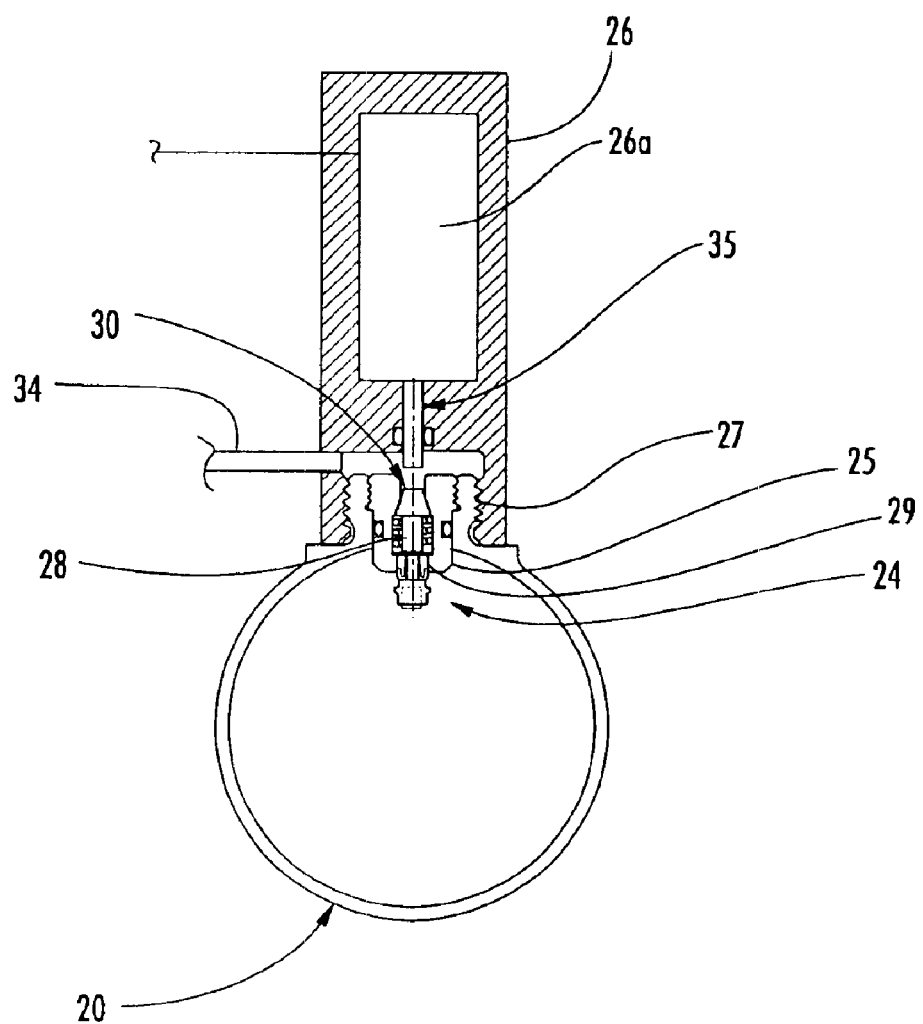
Figure 5:
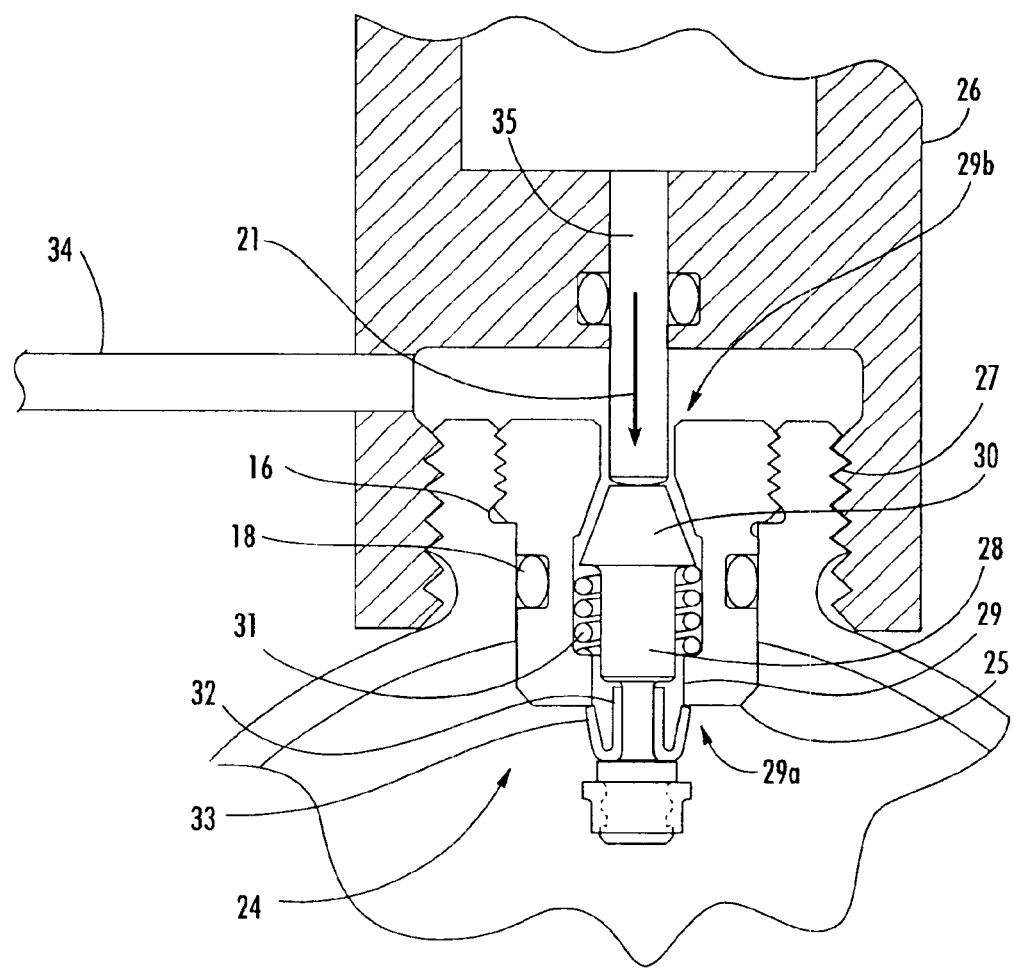
Figure 6:
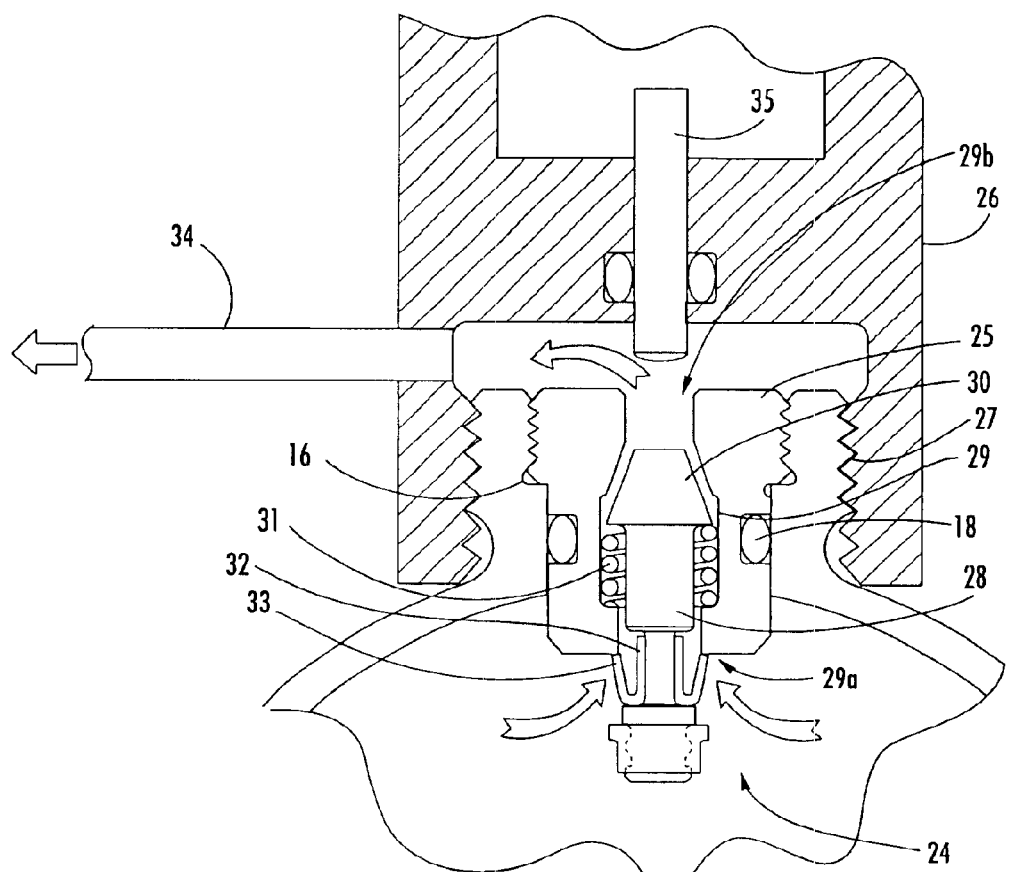

Having thus described the invention in general terms, reference will now be made to the accompanying drawings, which are not necessarily drawn to scale, and wherein:

FIG. 1 is schematic view illustrating the store ejection system according to one embodiment of the present invention;

FIG. 2 is a partially cut-away side view illustrating a suspension and release equipment (S & RE) module including an actuation system and an ejection mechanism according to one embodiment of the present invention and showing the range of motion of two ejector pistons;

FIG. 3 is a partially cut-away side view illustrating a portion of the suspension and release equipment module of FIG. 2;

FIG. 4 is a partially cut-away side view illustrating a pressure vessel and valve actuator for use in the system of FIG. 1 according to one embodiment of the present invention, shown with the valve in a closed position;

FIG. 5 is a section view illustrating the valve of the pressure vessel of FIG. 4, shown with the plunger of the valve actuator adjusting the valve to an open position; and FIG. 6 is a section view illustrating the valve of the pressure vessel of FIG. 4, shown with the valve in an open position and the plunger of the valve actuator retracted.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Referring now to FIG. 1, there is shown a pneumatically-driven store ejection system 10 according to one embodiment of the present invention. The ejection system 10 is used to releasably mount at least one jettisonable store 12 on an aircraft, as described below. The system 10 can alternatively be used to mount the store 12 on another structure such as a submarine or other vehicle. The store 12 can comprise any object that is to be released, including munitions such as bombs, missiles, rockets, and the like, or non-munitions such as a surveillance, communication, or avionic devices. The ejection system 10 includes an on-board pressure vessel 20 that is fluidly connected through a releasable valve 24 to an actuation system 52 and a pneumatically-driven jettison mechanism 70. A controller 90 is configured to actuate a dump valve 60 of the actuation system 52 to an open position in response to a control signal to jettison the store 12.

In the illustrated embodiment of FIG. 1, the ejection system 10 includes one actuation system 52 and one jettison mechanism 70. Thus, the pressure vessel 20 can have a volume and pressure sufficient for filling the single accumulator 54. In other embodiments of the present invention, however, the ejection system 10 can include any number of actuation systems 52 and jettison mechanisms 70, with the pressure vessel 20 being sized and pressurized accordingly. Each actuation system 52 and associated jettison mechanism 70 can comprise, in combination, a suspension and release equipment (S & RE) module 50, similar to the S & RE module discussed in U.S. Pat. No. 5,583,312, the entirety of which is herein incorporated by reference. As shown in FIG. 2, the actuation system 52 is disposed in a housing 51 with the jettison mechanism 70 for compactness and modularity, but various arrangements could be employed within the scope of the invention, including arrangements wherein some or all of the elements are disposed within the aircraft remotely from the housing 51. Store actuation and jettison devices are also described in U.S. Pat. Nos. 5,857,646; 5,857,647; 6,035,759; and 6,347,768 the entirety of each of which is herein incorporated by reference.

The pneumatically-driven jettison mechanism 70 is configured to releasably retain and jettison the store 12. As shown in FIG. 2, the store 12 is retained by hooks 74, 76, but other retention mechanisms can also be employed including other configurations of hooks, straps, clamps, magnets, and the like. A pair of ejector pistons 86, each of which can be retracted and extended, are used to thrust the store 12 away from the aircraft. For example, each ejector piston 86 can have multiple telescopic portions that define a common passage 88 therethrough that when filled with pressurized gas causes the piston 86 to extend. The pistons 86 can be biased to the retracted configuration, for example, by one or more springs 89 so that the pistons 86 automatically retract when de-pressurized. Alternatively, the pistons 86 can be retracted manually or by other mechanisms, either before or after the aircraft has returned from its flight. Although the jettison mechanism 70 of the embodiment illustrated in FIG. 2 is shown to include a pair of pistons 86, it is also understood that the mechanism 70 can include any number of pistons 86 such as, for example, a single piston.

Referring again to FIG. 1, the actuation system 52 includes the accumulator 54, the ejection dump valve 60, and a relief valve 56. The pressure vessel 20 is fluidly connected to the accumulator 54 via a feed line 34, which extends from the releasable valve 24 to the accumulator 54. Additional control valves and/or check valves can be provided in the feed line 34 to further control the flow of gas from the pressure vessel 20 to the actuation system 52. The dump valve 60 is fluidly connected to the ejector pistons 86 of the jettison mechanism 70 via a dump valve exit line 62 and dump passages 72, which fluidly connect, for example, to the passages 88. Thus, the ejector pistons 86 are actuated by releasing gas from the dump valve 60 through the dump valve exit line 62 and the dump passages 72.

In the illustrated embodiment of FIGS. 2 and 3, inside hooks 74 and outside hooks 76 are employed to releasably secure the store 12 to the jettison mechanism 70, but in other embodiments, any number of hooks, including a single hook, can be configured to secure the store 12 as is known in the art. The hooks 74, 76 can be actuated from an illustrated closed position to an open position by means of a hinged hook opening linkage 78, as is also well known in the art, which in turn is driven by a hook opening piston 80 that is reciprocallably slidable in a piston chamber 81. The hook opening piston 80 is reciprocatingly driven when the dump valve 60 is adjusted from the illustrated closed position to an open position, thereby permitting pressurized gas from the accumulator 54 to travel through port 82 into the piston chamber 81, thus acting to drive the piston 80 reciprocatingly downwardly to actuate the hook opening linkage 78. At the same time, pressurized gas is also permitted by the open dump valve 60 to flow through the dump valve exit line 62 and into the dump passages 72, thereby actuating the ejector pistons 86 to thrust the store 12 away from the aircraft simultaneously with its release from the hooks 74, 76. Springs 77 can be provided for biasing the hook opening linkage 78, and thus the hooks 74, 76, to the open and/or closed positions.

The pressure vessel 20 defines an internal space for holding a volume of pressurized non-pyrotechnic fluid, which provides the source of energy and the transfer mechanism for the ejector system 10. The pressure vessel 20 can be filled with air or other non-pyrotechnic gases from a high pressure gas source (not shown) such as a pressurized tank, a compressor, a pump, a gas generator, or other known filling means. In particular, the pressure vessel 20 can be filled before the vessel 20 is installed on the aircraft. In any case, the pressure vessel 20 preferably provides a pressurized non-pyrotechnic fluid that provides the source of energy and the transfer mechanism for the ejection system 10. Typically, the fluid is a gas such as helium, and is referred to herein as a gas, although other fluids can be used. Replaceable pressure vessels for providing non-pyrotechnic fluids are further described in U.S. patent application Ser. No. 10/205,570, titled "Store Ejection System with Replaceable Pressure Vessel," filed Jul. 25, 2002.

The energy of the pressurized gas in the pressure vessel 20 is dependent on both the volume of the vessel 20 and the pressure of the gas, both of which can be designed according to the particular needs of the ejector system 10. For example, if the pressure vessel 20 is used to fill a single accumulator 54, the pressure vessel 20 can be about twice the volume of the accumulator 54 and can be filled with gas at a pressure that is about twice the desired operating pressure of the accumulator 54 to achieve the desired operating pressure in the accumulator 54 when the pressure vessel 20 is fluidly connected thereto. In one embodiment, the volume of the pressure vessel 20 is about 30 cubic inches, and the vessel 20 is filled with gas to a pressure of about 10,000 psi at ambient temperature before installation of the vessel 20 on the aircraft so that an operating pressure of approximately 5000 psi can be achieved in the accumulator 54 during operation at low temperature flight conditions.

The pressure vessel 20 is releasably connected to the system 10 so that the pressure vessel 20 can be removed from the ejection system 10 and replaced as necessary. As shown in FIG. 1, the releasable valve 24 of the pressure vessel 20 is connected to the feed line 34, i.e., a pipe or hose extending to the accumulator 54. For example, the releasable valve 24 of the pressure vessel 20, better illustrated in FIGS. 4–6, can include a valve body 25 that is structured to be connected to a valve actuator 26 and the feed line 34 extending therefrom. A connection portion 16 defining threads extends annularly around the valve body 25 and is engaged to a correspondingly threaded portion of the pressure vessel 20. The pressure vessel 20, in turn, defines threads 27 that correspond with and connect to the valve actuator 26. In other embodiments of the present invention, the valve body 25, pressure vessel 20, and actuator 26 can alternatively be connected by other devices such as cam connections, quick connect plugs, and the like. In addition, o-rings 18 or other seals can also be provided between the valve body 25 and the pressure vessel 20 and/or between the pressure vessel 20 and the actuator 26 for preventing leaking of the gas therebetween. In any case, the pressure vessel 20 can be connected to the accumulator 54 before or after take-off of the aircraft and disconnected after use so that the pressure vessel 20 can be replaced or refilled.

In one advantageous embodiment, the pressure vessel 20 is disposable, i.e., the pressure vessel 20 is configured to be opened only once and thereafter discarded. For example, the valve 24 can be fixedly attached to the vessel and configured to be neither closed nor replaced after having been opened. A disposable pressure vessel can be discarded and replaced after each use, thereby reducing maintenance that might otherwise be required for the pressure vessel, including refilling, inspection of the vessel, and the like. Further, a disposable vessel is not generally subjected to the same stresses as a refillable vessel that is repeatedly filled and emptied. Thus, the disposable vessel can be formed of materials and/or with a structure that can be more cost effective than materials and structures that might be required for a refillable vessel.

The releasable valve 24 of the pressure vessel 20 can be adjusted from a closed configuration to an open configuration, and the releasable valve 24 is fluidly connected to the pressure vessel 20 and the feed line 34 such that the pressure vessel 20 is fluidly connected to the feed line 34 only when the releasable valve 24 is open. The releasable valve 24 can comprise a resealable device, i.e., a valve that can be released to the open position and then resealed to the closed position. Alternatively, the releasable valve 24 can comprise a non-resealable device, i.e., a valve that must be replaced in order to re-seal the pressure vessel 20. As shown in FIGS. 4–6, the releasable valve 24 includes an adjustable valve member 28 that is configured to be linearly adjusted from a closed position to an open position and locked in the open position. The valve member 28 is disposed in an aperture 29 extending between an inlet 29a and outlet 29b in the valve body 25. The valve member 28 is slidably adjustable in the aperture 29 from a closed position (FIG. 2) to an open position (FIGS. 3 and 4). In the closed position, a seal cap 30 of the adjustable valve member 28 is biased against the valve body 25 to form a seal so that the pressurized gas in the pressure vessel 20 is prevented from flowing through the aperture 29. The valve member 28 can be configured to be in the closed position when the member 28 is adjusted generally outward from the internal space of the pressure vessel 20, and the pressurized gas in the vessel 20 can therefore bias the valve member 28 to the closed position. In addition, or alternative, a spring 31 can be provided for biasing the adjustable valve member 28 to the closed position.

The valve 24 can also include a lock spring member that is configured to maintain the adjustable valve member 24 in the open position. For example, the lock spring member can be a leaf spring 32 that extends circumferentially around the valve member 28 with one or more arm portions 33 that are biased to open, e.g., by springing radially outward. Thus, when the adjustable valve member 28 is adjusted to the open position and the lock spring member 32 is advanced beyond the aperture 29 of the valve body 25, as shown in FIG. 4, the lock spring member 32 opens and prevents the valve member 28 from being retracted back into the aperture 29, thereby keeping the valve 24 open.

The valve actuator 26 is configured to open the valve 24, thereby fluidly connecting the pressure vessel to the accumulator 54. The valve actuator 26 includes a plunger 35, i.e., a post or other adjustable member that is advanced toward the pressure vessel 20 in direction 21 to linearly adjust the adjustable valve member 28 to the open position. For example, the valve actuator 26 can include a solenoid or other electromechanical device 26a that is configured to respond to a signal from the controller 90 by advancing the plunger 35 and opening the valve 24. As shown in FIG. 6, the actuator 26 can be configured to retract the plunger 35 after opening the valve 24.

While the valve actuator 26 can be used to open the valve 24 at any desirable time, according to one embodiment of the present invention, the valve 24 is opened only after a decision has been made to release the store 12. In this regard, the pressure vessel 20 can be sealed by the releasable valve 24 for an indefinite period of time, possibly including multiple aircraft flights, until it is desired to release the store 12. At such time when it is decided to release the store 12, the valve 24 is then opened by the valve actuator 26 so that the pressurized gas flows to the accumulator 54, thereby charging the accumulator 54 to a desired pressure. If the pressure in the accumulator 54 exceeds a desired pressure for operation, some of the pressurized gas can be released to the atmosphere through vent 58 controlled by a relief valve 56 that is configured to achieve a desired pressure in the accumulator 54. For example, the relief valve 56 can be a mechanical over-pressure valve that is mechanically configured to open when the pressure in the respective accumulator 54 exceeds the operating pressure by more than a predetermined pressure interval. Alternatively, a pressure sensor (not shown) can be used to monitor the pressure in the accumulator 54 and communicate with a pressure controller that controls the venting of gas through the relief valve 56. The time required for releasing the pressurized gas to the accumulator 54 and achieving the desired operating pressure in the accumulator 54 can be short, e.g., about 3 seconds or less in some embodiments. Thus, the accumulator 54 can be filled shortly before the store 12 is to be released.

Typically, if the accumulator 54 is filled shortly before the release of the store 12, the atmospheric pressure and temperature changes between the filling of the accumulator 54 and the release of the store 12 are minimal so that the system 10 need not subsequently repressurize the accumulator 54 before release of the store 12. Thus, while a pressure regulator or other device can be provided for controlling the flow of the gas from the pressure vessel 20 into the accumulator 54, it is typically not necessary to control the rate of the gas flow. Instead, the pressure vessel 20 can hold a sufficient volume and pressure of gas to fill the accumulator 54 to at least the desired operating pressure of the actuation system 52 and jettison mechanism 70, and the valve 24 can be opened so that the pressurized gas flows freely to the accumulator 54, with the relief valve 56 venting pressurized gas if necessary to achieve the desired operating pressure. The actuator 26 can be controlled by the same controller 90 that controls the operation of the dump valve 60. Alternatively, the actuator 26 can be controlled directly by a switch that is accessible to the crew of the aircraft.

In one exemplary manner of operation of the present invention, each S & RE module 50 is initially in an unpressurized state. Loading of the store 12 onto the jettison mechanism 70 of the S & RE module 50 triggers a store present switch 94 provided in the module 50. The store present switch 94 is in electrical communication with the controller 90, and the store present switch 94 communicates a "store present" signal to the controller 90 upon loading of the store 12. At some time after the store 12 is loaded, the controller 90 releases the releasable valve 24, for example, upon the decision to release the store 12 and/or according to a controller operation program. Upon release of the releasable valve 24, gas flows from the pressure vessel 20 through the feed line 34 to the accumulator 54 of the S & RE module 50. In one embodiment, the store present switch 94 of the module 50 detects whether or not the store 12 has been mounted on the jettison mechanism 70 and transmits a control signal when the store 12 is present to control the filling of the accumulator accordingly. For example, if no store 12 is present, the controller can prevent the valve actuator 26 from opening the valve 24 and, hence, the pressure vessel 20 to pressurize the accumulator 54. The accumulator 54 can also be vented after the store 12 has been jettisoned from the accumulator 54, either before or after the aircraft lands. For example, the store present switch 94 can be adapted to transmit a control signal when a store 12 is absent so that any pressure in the accumulator 54 can be released, e.g., through the dump valve 60 or the relief valve 56. Alternatively, a ground crew member can manually actuate the relief valve 56 after the aircraft lands to release the pressurized gas from the accumulator 54.

As shown in FIG. 1, the controller 90 can also electrically communicate with an ejection initiator, such as a store management system (SMS) 92 as is known in the art for controlling the release and jettison of stores, or a manual release switch (not shown) that is activated by a member of the aircraft crew. Upon activation, the ejection initiator issues a control signal to eject one or more stores from one or more of the ejection systems 10. The controller 90 receives the control signal and actuates the corresponding dump valve 60 to the open position, thereby permitting pressurized gas from the accumulator 54 to flow through port 82 into the piston chamber 81. The gas drives the hook opening piston 80 downwardly to release the hooks 74, 76 while also flowing through the dump valve exit line 62 and the passages 72 to pressurize and drive each of the ejector pistons 86 to their extended positions. Thus, the gas not only is the source of energy, but also the transfer mechanism to release the store 12. The hooks 74, 76 release the store 12, and the ejector pistons 86 thrust the store 12 clear of the aircraft. As the hooks 74, 76 open, the store present switch 94 detects a "store absent" condition, which is transmitted to the controller 90. The controller 90 can close the enable valves 36 and prevent additional gas from flowing to the S & RE module 50. At the end of the ejector piston stroke, vent ports 83 are exposed, as shown in FIG. 2, discharging substantially all residual accumulator pressure and permitting the springs 89 to retract the ejector pistons 86 to their retracted position. Thus, the S & RE module 50 may be operated to remain fully discharged and dormant after firing its store, resulting in both greater flight safety and a safer environment for working on the aircraft after landing.

Many modifications and other embodiments of the invention set forth herein will come to mind to one skilled in the art to which this invention pertains having the benefit of the teachings presented in the foregoing descriptions and the associated drawings. For example, the controller 90 and the SMS 92 can be individual devices as illustrated in FIG. 1, a single integrated device, or can comprise any number of separate components. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A store ejection system for mounting a jettisonable store, the store ejection system using a gas as the source of energy and the transfer mechanism and comprising:

an on-board pressure vessel of pressurized non-pyrotechnic gas for providing the source of energy and the transfer mechanism;

a releasable valve configured to hermetically seal the pressure vessel, the releasable valve having an adjustable valve member adapted to be adjusted from a closed position to an open positions thereby releasing the gas from the vessel;

an actuation system comprising an accumulator configured to be fluidly connected to the pressure vessel to receive and store the gas from the pressure vessel, a dump valve for controlling a flow of gas from the accumulator, and a controller for actuating the dump valve to an open position in response to a control signal to jettison the store;

a pneumatically-driven jettison mechanism for releasably retaining the store, the jettison mechanism fluidly connected to the dump valve such that actuating the dump valve to the open position releases the pressurized gas in the accumulator to flow to the jettison mechanism, thereby actuating the jettison mechanism to jettison the stote; and a valve actuator configured to receive a signal from the controller and adjust the valve member from the closed position to the open position in response to the signal from the controller after the pressure vessel is installed in the system such that the releasable valve hermetically seals the pressure vessel until the pressure vessel is installed in the system and the controller issues the signal to the valve actuator.

2. A store ejection system according to claim 1 wherein the releasable valve has a valve body defining an aperture extending between an inlet and outlet and providing a passage for the gas from the pressure vessel at least partially to the accumulator, the adjustable valve member being slidably adjustable in the aperture from the closed position to the open position, the adjustable valve member in the closed position being biased against the valve body to seal the aperture.

3. A store ejection system according to claim 2 wherein the adjustable valve member is configured to slide toward an internal space of the pressure vessel to open the valve and fluidly connect the pressure vessel to the accumulator such that the gas in the pressure vessel biases the adjustable valve member to the closed position.

4. A store ejection system according to claim 2, further comprising a spring configured to bias the adjustable valve member to the closed position.

5. A store ejection system according to claim 2, further comprising a lock spring member configured to open when the adjustable valve member is adjusted to the open position, the lock spring member thereby locking the adjustable valve member in the open position.

6. A store ejection system according to claim 2 wherein the valve actuator is configured to advance a plunger in response to the signal from the controller the plunger configured to linearly adjust the adjustable member to the open position.

7. A store ejection system according to claim 1 wherein the pressure vessel is configured to be substantially directly fluidly connected to the accumulator such that the gas is delivered from the pressure vessel to the accumulator with a substantially uniform pressure therebetween.

8. A storm ejection system according to claim 1 wherein the actuation system further includes a relief valve for venting the gas from the accumulator.

9. A store ejection system according to claim 1 wherein the jettison mechanism further comprises at least one hook for releasably retaining the store, each hook configured to be actuated to release the store from the jettison mechanism by the pressurized gas exiting the accumulator through the dump valve.

10. A store ejection system according to claim 9 wherein the jettison mechanism further comprises at least one ejector piston for forcibly jettisoning the store when the hook has been actuated to a release position, each ejector piston being actuated to jettison the store by the pressurized gas exiting the accumulator through the dump valve.

11. A store ejection system according to claim 1 wherein the releasable valve is fixedly attached to the pressure vessel and the valve is configured to be non-resealable after the valve member is actuated to the open position.

12. An apparatus for providing anon-pyrotechnic gas for a store ejection system using the gas as the source of energy and the transfer mechanism, the apparatus comprising:

a pressure vessel defining an internal space for holding the non-pyrotechnic gas; and a releasable valve comprising:

a valve body defining an aperture extending between an inlet and outlet and providing a passage for the gas to exit the internal space of the pressure vessel;

an adjustable valve member being slidably mounted in the aperture and adapted to be adjusted from a closed position in which the adjustable valve member hermetically seals the aperture to an open position to release gas from the vessel, the adjustable valve member being configured to slide toward the internal space of the pressure vessel to open the valve such that the gas in the pressure vessel biases the adjustable valve member to the closed position; and a lock spring member configured to open when the adjustable valve member is adjusted to the open position, the lock spring member thereby locking the adjustable valve member in the open position.

13. An apparatus according to claim 12, further comprising a spring configured to bias the adjustable valve member to the closed position.

14. An apparatus according to claim 12, further comprising a threaded connection portion extending annularly around the valve body such that the valve body can be connected to the store ejection system and the gas can be delivered from the pressure vessel to the ejection system.

15. An apparatus according to claim 12 wherein the valve body is fixedly attached to the pressure vessel and the releasable valve is configured to be non-resealable after the valve member is actuated to the open position.

* * * * *